United States Patent [19]

Arzberger et al.

[11] Patent Number: 4,703,770

[45] Date of Patent: Nov. 3, 1987

[54] DISPENSER CONTROL CIRCUITRY

[75] Inventors: William Arzberger, Medfield; Wayne Warren, Lexington; Michael Riley, Pembroke; Martin Segal, Newton, all of Mass.

[73] Assignee: Jet Spray Corp., Norwood, Mass.

[21] Appl. No.: 653,674

[22] Filed: Sep. 21, 1984

[51] Int. Cl.[4] .......... G05D 11/00

[52] U.S. Cl. .......... 137/88; 62/391; 222/333

[58] Field of Search .......... 62/391, 394, 59; 222/57, 333, 63; 137/88

[56] References Cited

U.S. PATENT DOCUMENTS

| | | | |
|---|---|---|---|
| 3,055,551 | 9/1962 | Johnson | 222/333 |
| 3,323,681 | 6/1967 | Di Vette et al. | 62/394 |
| 4,124,146 | 11/1978 | Sealfon | 222/641 |
| 4,189,067 | 2/1980 | Nottke et al. | 222/57 |

*Primary Examiner*—William E. Wayner
*Attorney, Agent, or Firm*—Wolf, Greenfield & Sacks

[57] ABSTRACT

A system for dispensing and controlling the concentrate of a juice product in which the product is made up of a juice concentrate and water. The concentrate is dispensed by pump operation and the water is dispensed by solenoid operation. The system basically provides for the control of the solenoid and the pump and for the initiation of a dispensing cycle so as to initiate operation of the solenoid and pump substantially at the same time. A timer responds for operating the solenoid and pump over a preselected dispensing period. The control of the pump to provide concentration control is provided by a speed control circuit having multiple selectable positions for providing multiple pump speeds so as to in turn provide variable concentration of the final dispensed juice product.

11 Claims, 20 Drawing Figures

204
57
58
206
208
210
56
212
214
44
44M
46
46M
200
216L
216R
202

Fig. 1B
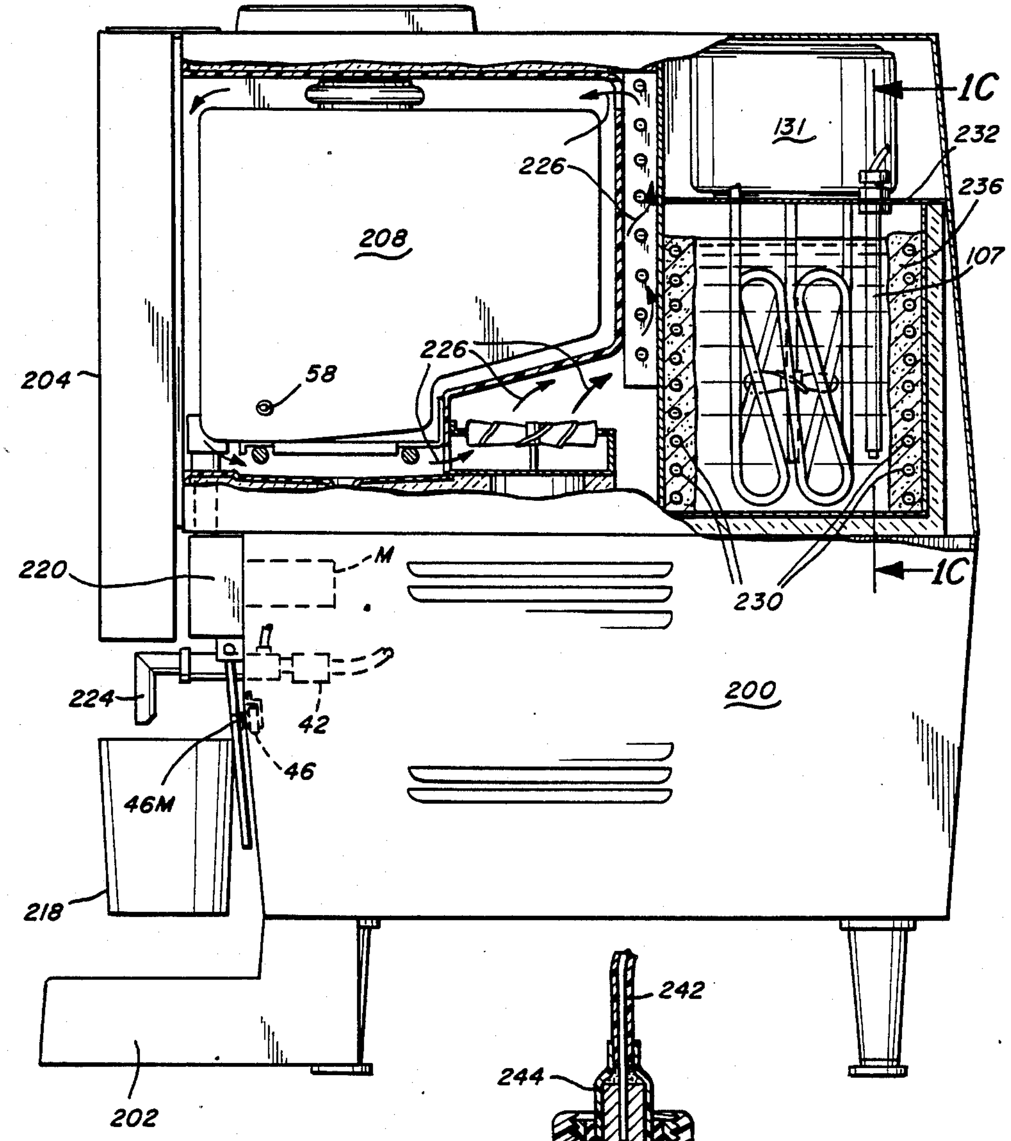
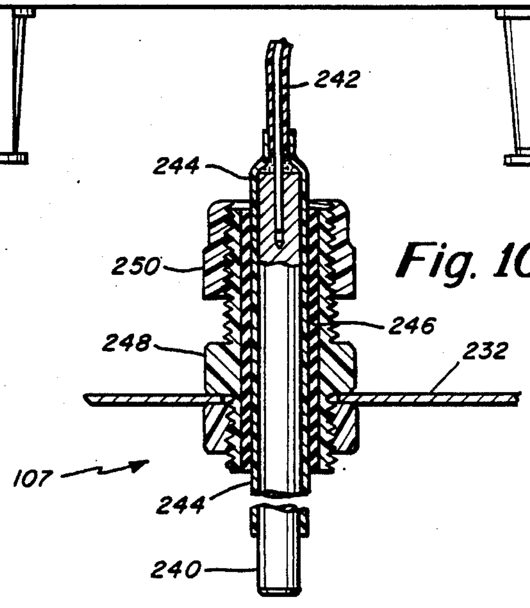
Fig. 1C

CURRENT THROUGH PHOTO TRANSISTOR 14

VOLTAGE AT NON-INVERTING INPUT OF COMPARATOR 16

VOLTAGE AT OUTPUT OF COMPARATOR 16

VOLTAGE AT INPUT OF COMPARATOR 18

VOLTAGE AT OUTPUT OF COMPARATOR 18

VOLTAGE AT OUTPUT OF COMPARATOR 20

VOLTAGE AT LINE 22

VOLTAGE AT NODE FORMED BY TIMING RESISTOR, TIMING CAPACITOR, AND ISOLATION RESISTOR.

VOLTAGE AT OUTPUT OF OSCILLATOR

VOLTAGE AT INPUT OF ENVELOPE DETECTOR

VOLTAGE AT PROBE

VOLTAGE AT OUTPUT OF ENVELOPE DETECTOR

DISPENSER CONTROL CIRCUITRY

BACKGROUND OF THE INVENTION

The present invention relates in general to a control circuit for a dispenser. More particularly, the invention pertains to a control circuit for controlling the dispensing of fruit juices and those in which it is, in particular, desired to control the concentration thereof. Even more particularly, the invention pertains to a control system for a concentrated citrus juice dispenser in which the dispenser is adapted to mix chilled water and concentrate juice with high accuracy so as to obtain a predetermined and desired concentration of the final juice product.

In citrus juice dispensing machines, the final juice product is formed by combining concentrated citrus juice with chilled water. In mixing these two components, it has been found that the taste of the final product is a very sensitive function of the concentration of the mixing. At the present time, there are no effective techniques for closely controlling the concentration of concentrated citrus juice and as a result, under varied operating conditions one can encounter juice products that have wide ranges of concentration. This seriously effects the taste of the juice as experienced by the consumer. There is also, at the present time, no effective way of taking into account the variations that occur in the reconstituted citrus juice product. For example, there may be variations between different brands and this many times causes a change in the ultimate concentration of the drink. This is highly undesirable. Also, it is quite common for a user of the dispenser to change from one juice product to another such as from orange juice to grape juice or to apple juice. Usually when such changes are made, there is a different concentration to each juice concentrate and unless this is taken into account, the final drink product may be either too watery or too thick.

Accordingly, it is an object of the present invention to provide an improved control system for a dispensing machine in which the concentration of the fruit juice can be closely controlled and closely regulated.

Another object of the present invention is to provide a dispenser control circuit that is adapted to carry out multiple control functions associated with the dispensing of citrus or other fruit juices while at the same time being adapted to highly accurately control the concentration of the final drink product.

Still another object of the present invention is to provide a dispenser control circuit as in accordance with the preceding object and in which the concentration may be manually selected and may be selected to occur over a range of concentrations including multiple individual concentrations that may be achieved.

SUMMARY OF THE INVENTION

To accomplish the foregoing and other objects, features and advantages of the invention, there is provided a system for controlling the dispensing of fruit juices and in particular a control system which controls the concentration of fruit juices. The system of the present invention is in particular used in association with reconstituted citrus juice in which the dispenser is adapted to mix chilled water and concentrate juice with high accuracy so as to obtain a predetermined and desired concentration of the final juice product. The concentrate is dispensed by pump operation and the water is dispensed by solenoid control. The system generally comprises means for controlling the solenoid and also means for controlling the pump. A dispensing cycle is initiated so as to initiate operation of the solenoid and pump which are controlled to operate substantially at the same time. Timer means are provided responsive to cycle initiation for operating the solenoid and pump over a preselected dispensing period. In accordance with the invention, means are provided for controlling the pump including a speed control means having multiple selectable positions for providing multiple pump speeds so as to provide variable concentration of the final dispensed juice product. The speed control means in accordance with the invention comprises a speed control circuit having manual control switch means settable at multiple different switch position settings to provide different speeds. This speed control circuit comprises an input network connected in a feedback loop for sensing motor speed and also a frequency-to-voltage converter circuit coupling from the input network and for providing a DC signal, the amplitude of which is a function of operating speed. A differential amplifier is used to combine the sensed motor speed with a desired speed so as to provide in essence a speed control signal that can alter the speed of the motor to bring it into line with the desired speed. This circuit operates on a continuous feedback basis.

In accordance with another feature of the present invention, there is provided a circuit for conductivity measurement by means of a probe. This circuit is employed in accordance with the present invention, in connection with measuring ice conductivity so as to determine ice build-up about the evaporator coils. Furthermore, the circuit is employed in association with detection of the concentrate level in the concentrate storage tank. This circuit comprises an oscillator and means coupling the oscillator to the probe. There is also provided an envelope detector which couples from the probe and which in turn couples to an output threshold trigger circuit. In connection with the circuit for use in detecting ice build-up, when the probe is contacted by the ice, then the probe resistance increases. The envelope detector detects a change in the amplitude of the envelope and the trigger circuit then operates to interrupt power to the compressor. This prevents further cooling and prevents further build-up of ice on the evaporator coils. In connection with the sensing of concentrate in the tank, the circuit operates so that when the level falls to a certain point in the tank, the circuit is activated so as to interrupt any further dispensing. Any dispensing presently in progress will be completed but a new dispense cycle will be inhibited.

In accordance with another feature of the present invention, the dispensing cycle is initiated by improved means which includes a combination of elements including a magnet and associated Hall effect switch. When the cup is placed in position for the dispense, the magnet is brought in closer relationship to the Hall effect switch and this causes initiation of circuit operation. Thus, there has been eliminated any need for the use of mechanical switching arrangements to initiate a dispense cycle.

BRIEF DESCRIPTION OF THE DRAWINGS

Numerous other objects, features and advantages of the invention should now become apparent upon a reading of the following detailed description taken in conjunction with the accompanying drawing, in which:

FIG. 1B is a side cross-sectional view of the dispenser of FIG. 1A also partially cut away to show further details of the dispenser and in particular the evaporator coil section with the associated ice probe;

FIG. 1C is a cross-sectional view taken along line 1C—1C of FIG. 1B showing further details of the ice probe;

DETAILED DESCRIPTION

Figure 1A:
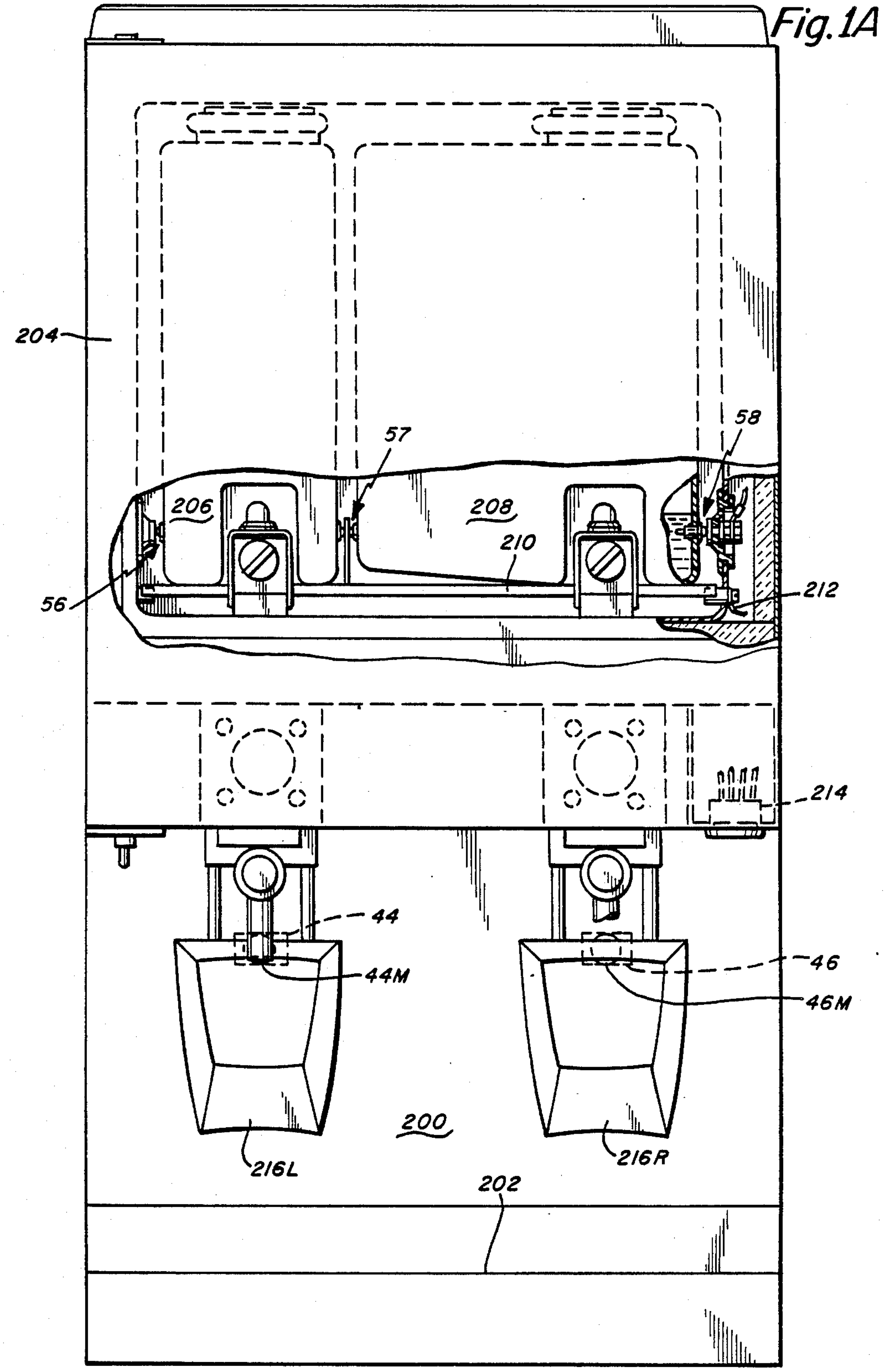
FIG. 1A is a front view of a dispenser incorporating the principles of the present invention particularly as it applies to controlling drink concentration and illustrating part of the dispenser cut away to show further details.

Referring now to the drawings, there is shown a dispenser incorporating the principles of the present invention in the form of a reconstituted citrus juice dispenser adapted to mix chilled water and concentrate juice with high accuracy so as to obtain a predetermined and desired concentration of a final juice product. The dispenser is illustrated in FIG. 1A in a front view and is illustrated in a cut-away side view in FIG. 1B. FIG. 1C illustrates the details of the ice probe 107. Because the principles of the present invention apply for the most part to the concentrate control and other associated control circuits, the mechanical members are not shown in complete detail. However, FIGS. 1A and 1B illustrate the dispenser as including a housing 200 having at the front thereof, an overflow tray 202. At the front of the unit there is provided a door 204 which is shown partially cut away in FIG. 1A. This door may be locked, but may be readily opened to provide access to the juice tanks contained therein. These juice tanks include tanks 206 and 208. The tanks 206 and 208 may also be referred to as left and right tanks, respectively. Hereinafter, in the circuit description, the tanks are so referred to as left and right tanks and associated left and right controls. The controls for dispensing product from each of the tanks are substantially the same and only one is described in detail hereinafter in connection with FIGS. 2–4.

FIG. 1A illustrates the left and right probes that are used to detect when the liquid level in either of the tanks has decreased to a sufficiently low level so that the tank should be refilled. These probes include a left tank probe 56 also shown in FIG. 4 and a right tank probe 58 also illustrated in FIG. 4. It is also noted that there is a common connection 57 which provides a common ground for both of these tanks. Both of the tanks rest upon a metal tray 210 as illustrated in FIG. 1A.

In the illustration of FIG. 1A it is noted that the right tank probe 58 is still exposed to the juice concentrate and thus there is a conductivity path essentially from the probe 58 to common connection 57. When the liquid level falls below probe 58, this conductivity is interrupted and this interruption in conductivity is sensed. The circuitry for providing this sensing is discussed in further detail hereinafter. In connection with FIG. 1A it is also noted that there is provided a ground wire 212 which couples to the metal tray 210 for providing the completed conductivity path when there is sufficient liquid in either of the tanks.

FIG. 1A also illustrates the remote connector 214 which enables remote control of dispensing. This is employed when there is a beverage hose and it is desired to provide certain electrical control functions at the beverage hose. Reference to this remote control is discussed in further detail hereinafter with regard to the circuit diagrams.

FIG. 1A also illustrates the actuating bars 216L and 216R. In this connection reference may also be made to FIG. 1B which shows a cup 218 pressed against one of the actuating bars 216. Bar 216R supports the magnet 46M while the bar 216L supports the magnet 44M. When the actuating bars are moved inwardly or to the right in FIG. 1B by virtue of the cup 218 being moved thereagainst, then the magnet of the actuated bar is brought into proximity with either the Hall effect switch 44 or the Hall effect switch 46. Each of these Hall effect switches is mounted in the position illustrated in FIG. 1B just inside of the housing 200 and in a position to be responsive to the position of the associated magnet. The operation of the Hall effect switch is discussed in further detail hereinafter in connection with the circuit diagrams.

The cross-sectional view of FIG. 1B also illustrates the position of the solenoid valve 42 and also shows the pump 220 driven from its associated motor. Again, in the circuit diagram the motors M1 and M2 are illustrated and each of these motors drives an associated pump for pumping the concentrate from one of the tanks such as tank 208 in FIG. 1B to the output spout 224 illustrated in FIG. 1B. Just before the spout 224 the water is mixed by virtue of actuation of the water solenoid valve 42.

In accordance with the present invention the control of concentrate is carried out by providing a substantially fixed water feed by providing pressure regulation through the solenoid valve so that when the solenoid valve is actuated, substantially the same volume of water is dispensed over any given predetermined period. The concentration is thus controlled for the most part by varying the speed of the pump motor so that the final concentration of the drink is readily controlled.

FIG. 1B also shows within the housing 200 the cooling portion of the system. The cooling apparatus is disposed to the rear of the juice tanks. In FIG. 1B the arrows 226 illustrate the direction of air flow so that the air is cooled next to the cooling apparatus and circulates about the tanks so as to maintain the juice concentrate therein at a cooled level. The cooling apparatus includes a compressor 130 and a bank of evaporator coils 230. In connection with FIG. 1B the compressor is located within the housing 200. FIG. 1B also illustrates the agitator motor 131 which is supported from a support plate 232. Also supported from this plate 232, as illustrated in FIG. 1C is the ice probe 107. It is noted in particular that the ice probe 107 is disposed a relatively close predetermined distance from the evporator coils so that when the ice builds up sufficiently, the probe will be contacted and a signal is generated to then inhibit further operation of the compressor until the ice melts sufficiently to uncover the probe. The ice build up is illustrated in FIG. 1B at 236. In accordance with the present invention there is provided, as discussed in further detail hereinafter in connection with FIG. 5, a circuit for detecting ice build up referred to hereinafter as an ice bank probe circuit.

With regard to the probe 107, reference is made to FIG. 1C which shows the probe and its means of support from the plate 232. The probe comprises a main probe member 240 which may be of stainless steel. The stainless steel rod 240 has a wire 242 connected at the top thereof as illustrated. The bottom end of the rod 240 extends downwardly into the evaporator coil bank such as clearly illustrated in FIG. 1B. At the top end of the rod 240 there is provided a heat shrink tubing 244 which is in turn supported by a Neoprene sleeve 246. The sleeve 246 is in turn supported in a coupling 248 having at the top thereof threaded on the outside thereof, a compression fitting 250. As indicated previously, further reference will be made to the ice bank probe in connection with the circuit diagram of FIG. 5 to be described hereinafter.

Figures 2, 3:
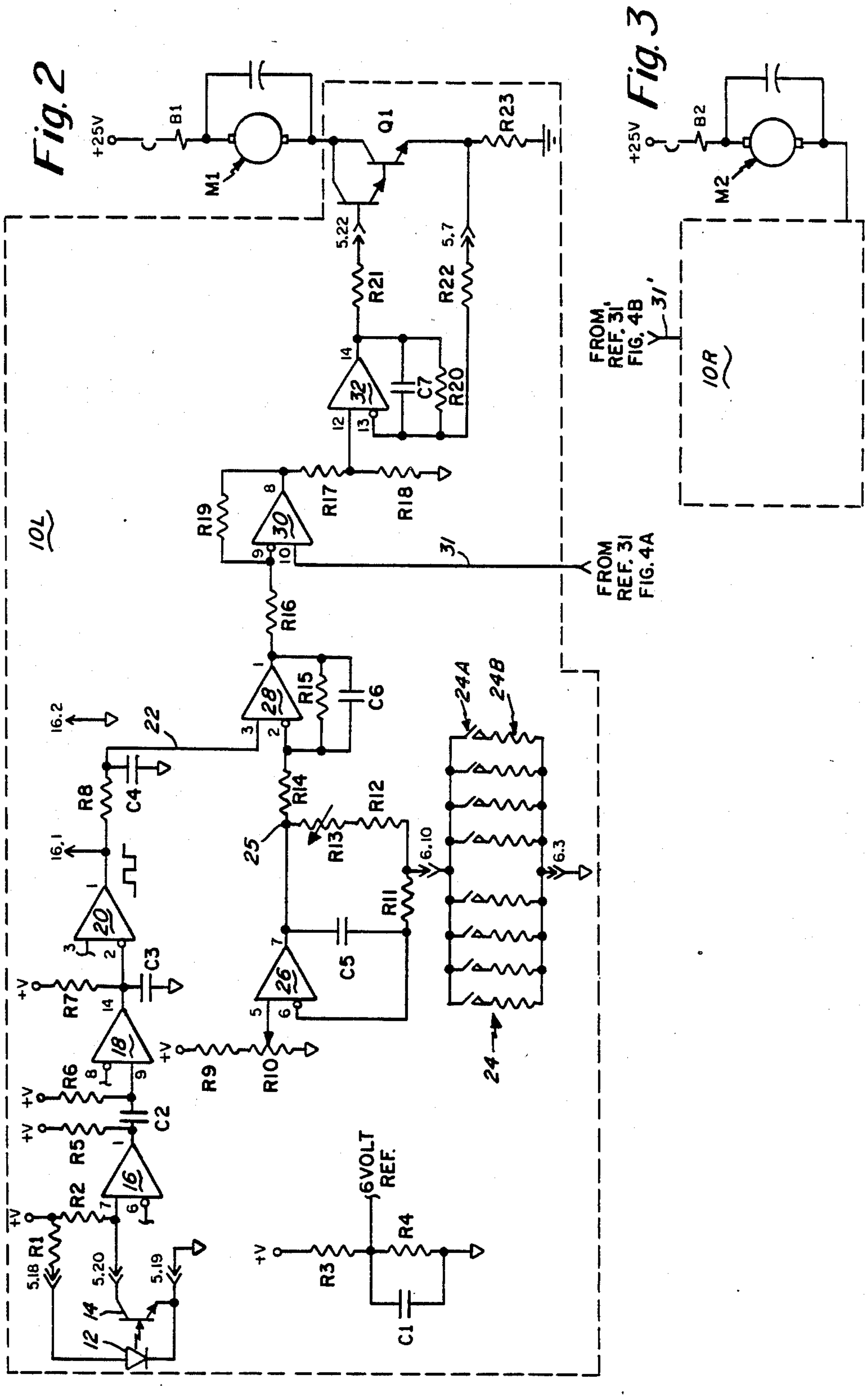
FIG. 2 shows a portion of the control circuitry of the present invention and in particular shows the motor speed control associated with one of the beverage or juice beverage units referred to herein as the left unit.
FIG. 3 is a second diagram mostly in block form illustrating the motor speed control for the right dispenser unit.

The speed at which the reconstituted juice concentrate is pumped into the mixing chamber of the dispenser is controlled by a closed-loop motor speed control circuit. The details of the motor speed control circuit associated with the left tank are depicted in FIG. 2. FIG. 3 is primarily a block diagram illustrating the motor speed control circuit associated with the right tank. FIG. 3 has been shown as a block diagram because the basic circuit is identical for speed control associated with both left and right tanks.

The speed control in accordance with the invention holds the motor speed, such as of left pump motor M1 constant, even when the line voltage or the motor load varies. By maintaining the speed of the pump motor M1 constant, the concentrate pumping rate is held constant. Moreover, this speed is determined by the electronic circuitry and thus if there is a need for replacing the motor assembly itself, this can be done without requiring any recalibration.

Figures 5, 6:
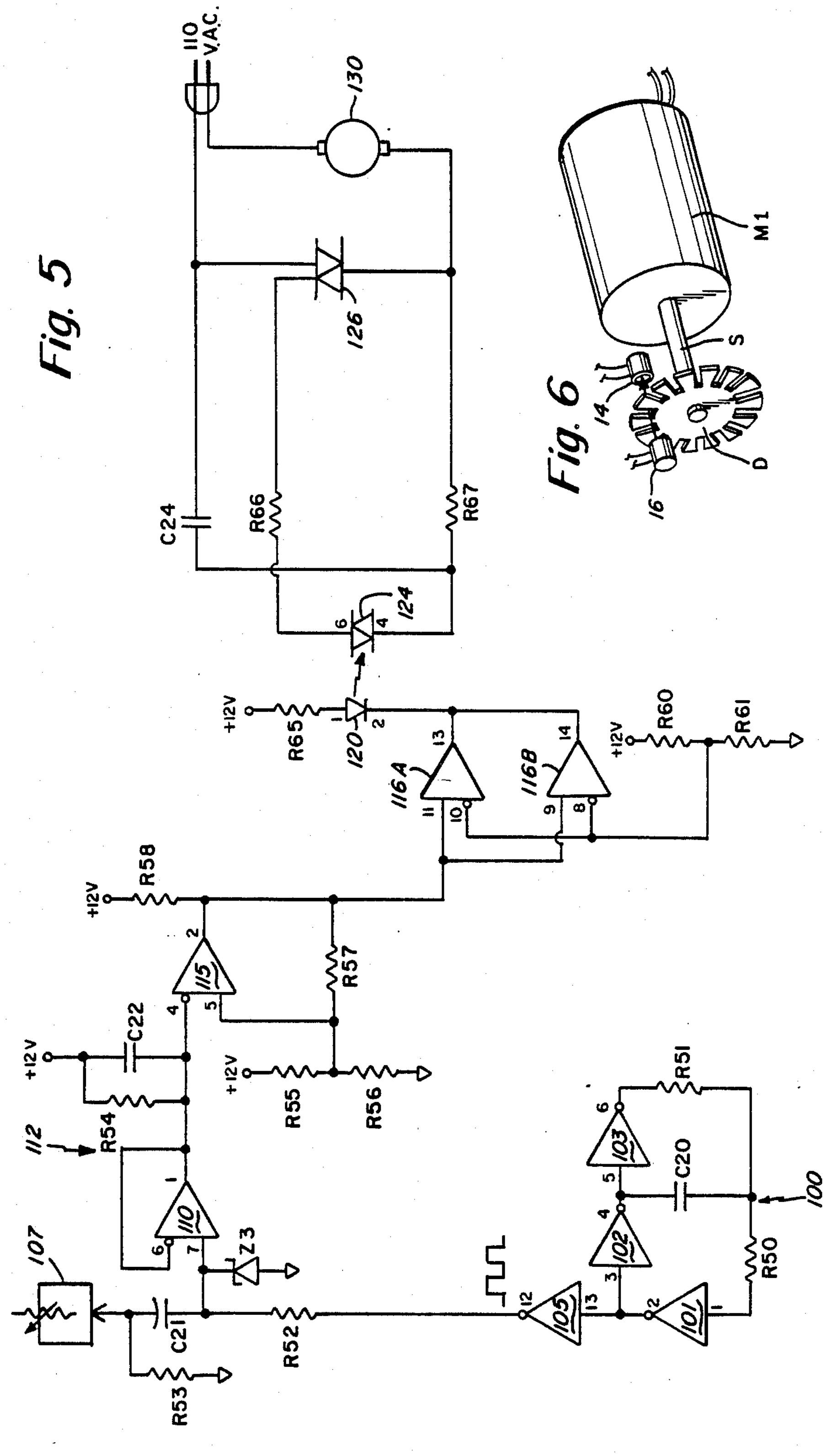
FIG. 5 is a circuit diagram of the ice bank sensing circuit in accordance with the present invention.
FIG. 6 schematically illustrates the pump motor and associated means for carrying out the speed control.
Figure 7A:
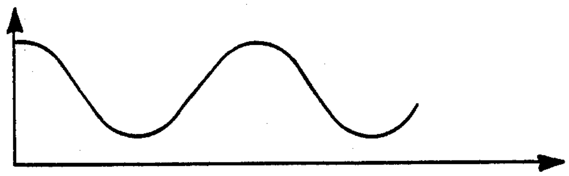
FIG. 7A–7L illustrate waveforms associated with the circuit of the present invention.

Thus, in FIGS. 2 and 3, there are shown respective left and right pump motors M1 and M2 with associated motor speed control circuits 10L and 10R. In FIG. 2 the left motor speed control circuit 10L is shown in detail. In FIG. 3 the right motor speed control circuit 10R is shown in block form because this circuit is substantially identical to the detailed circuit 10L shown in FIG. 2 and for simplicity it was not deemed necessary to duplicate the entire circuit again. In this connection in FIG. 3 it is noted that the circuit 10R connects to one side of the motor M2. The opposite side of the armature of the motor M2 connects to a circuit breaker which in turn is connected to the positive DC supply voltage. Similarly, the motor M1 has one side coupled to the the circuit 10L and the other side coupled to a circuit breaker which in turn is connected to the positive supply voltage. This DC pump motor in either FIG. 2 or FIG. 3 is adapted for driving the vane pump through a reduction gearbox not shown in detail herein. The DC motor also drives a slotted disk as shown in FIG. 6. More particularly, in FIG. 6, the pump motor M1 is illustrated as having a shaft S for supporting the slotted disk D. The slotted disk interrupts an infrared beam. This radiation is emitted by a light emitting diode 12. The radiation extends through the slots in the disk D and is detected by a phototransistor 14. This arrangement essentially forms a tachometer. In this regard also refer to FIG. 2 which shows the light emitting diode 12 and the phototransistor 14. As the disk rotates, photocurrent varies from high to low, and this variation is detected to be used in determining motor speed. (See FIG. 7A).

Figure 7B:
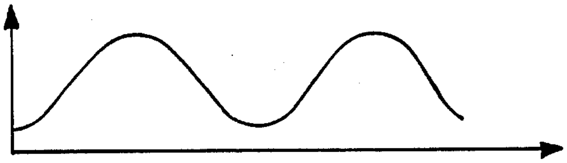
Figure 7C:
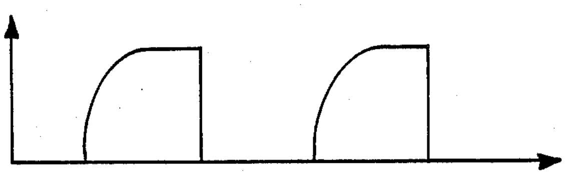
Figure 7D:
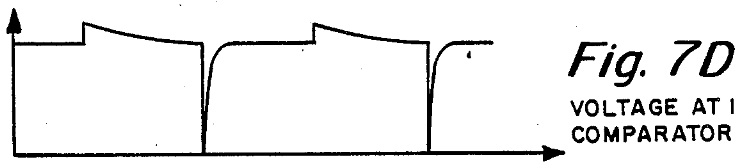

Thus, one part of the motor speed control circuit 10L includes the tachometer portion comprised of the aforementioned diode 12 and transistor 14. This speed sensing input is coupled to resistors R1 and R2 and to the first comparator 16. The resistors R1 and R2 couple to the positive voltage supply. Resistor R1 also couples to the anode of light emitting diode 12, thereby causing a predetermined current to flow through the light emitting diode. The other side of resistor R2 couples to the collector of transistor 14 and also into one input of the comparator 16. The other input to the comparator 16 is a reference input. In this regard, note the reference circuit comprised of equal valued resistors R3 and R4 across the +12 V power supply along with capacitor C1. This reference circuit establishes a +6 volt reference. This +6 volt reference couples to comparator 16 and also to other points in the circuit to be described hereinafter. Thus, the reference input to comparator 16 is a +6 volt reference. The resistor R2 forms a load resistance giving rise to a varying voltage as the photocurrent varies (See FIG. 7B). This voltage is coupled to the voltage comparator 16. The output of the comparator 16 (see FIG. 7C) couples to a pulse forming network which is comprised of resistors R5 and R6 along with capacitor C2. The output of this network produces relatively sharp negative-going pulses (see FIG. 7D) which couple to one input of a second comparator 18. The second comparator 18 also has this same +6 volt reference input at its second input as previously described.

Figure 7E:
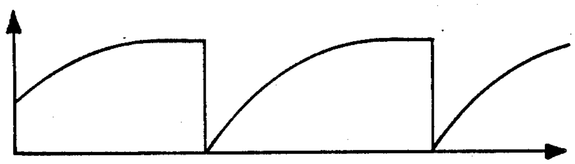
Figure 7F:
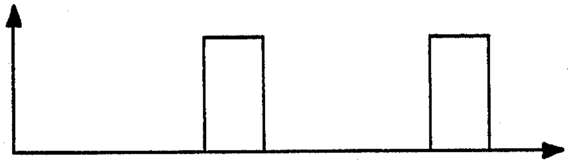

In operation, as the photocurrent increases past a certain point, the comparator 16 input voltage decreases past a threshhold and the output stage thereof turns on. This creates a short pulse from the pulse forming network which, as was mentioned previously, creates a series of negative going sharp pulses. These pulses couple to the second comparator 18. This comparator also turns on, momentarily discharging a timing capacitor C3 (see FIG. 7E). The capacitor C3 connects to the output of comparator 18 and it is also connected at its other side to ground potential. A resistor R7 is connected in series with capacitor C3 and couples to the positive voltage supply. The capacitor recharges through this pull-up resistor R7 and operates with a characteristic time constant which is independent of the level-crossing frequency of the photocurrent. The voltage across the timing capacitor C3 couples to a high slew-rate operational amplifier 20 which is used as an active pull-up comparator. During the interval that the timing capacitor is discharged, the output of the operational amplifier 20 goes to its high level and as the capacitor charges and reaches a predetermined voltage level, the output of the operational amplifier switches (see FIG. 7F). This creates a pulse of constant height (voltage) and width (time).

Figure 7G:
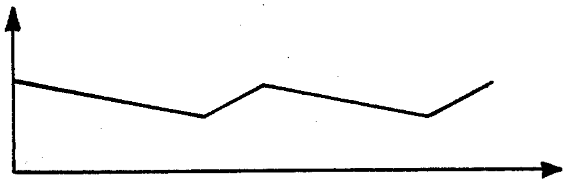

The output of the operational amplifier 20 couples to an RC lowpass filter which is comprised of resistor R8 and capacitor C4. The output of the lowpass filter at line 22 is essentially a DC voltage, the value of which is a function of the input frequency sensed by the tachometer (see FIG. 7G). The time constant of the filter network is significantly longer than the time between input pulses, even at the lowest desired pump speed. Thus, the voltage at the output of the filter may be considered to be the average voltage at the output of the operational amplifier with a small ripple voltage superimposed thereon. The average voltage is directly proportional to the motor speed. Thus, there is established on line 22 a voltage, the value of which is representative of the speed that is being sensed of operation of the pump motor M1.

FIG. 2 also shows the circuit of the two digit BCD thumbwheel switch 24 which comprises a plurality of separate contacts 24A and associated plurality of resistors 24B. These contacts are connected to the resistor network in such a way that the conductance is proportional to the thumbwheel setting. The thumbwheel switch with its associated resistor network as noted in FIG. 2 couples from ground to a further network including an operational amplifier 26 which is connected in a negative feedback arrangement in such a way that the output voltage thereof varies proportionately with the thumb wheel conductance, with offset and span being determined by factory set trimmer resistances R10 and R13, respectively. The entire network including resistor R9 and variable resistor R10 forms a voltage divider network coupled to one input of the operational amplifier 26. The other input to the operational amplifier 26 is coupled in a feedback arrangement including capacitor C5, resistors R11 and R12 and variable resistor R13. There is also provided one additional resistor R14 which directly couples the output of the operational amplifier 26 to a further operational amplifier 28.

Thus, in summary, there is a first signal on line 22, the DC value of which is representative of the frequency actually being sensed at the pump motor. The second signal on the line 25 is a DC signal representative of the desired speed of operation of the motor. As long as the motor is operating at the desired speed, then these two voltages are substantially the same.

The voltage generated by the motor speed sensing circuit and the voltage from the motor speed setting circuit are differentially combined by virtue of the signals on lines 22 and 25 being coupled to a further operational amplifier 28. It is noted that the operational amplifier 28 has associated therewith a roll-off capacitor C6 and associated resistor R15. The roll-off capacitor limits frequency response. This reduces the ripple associated with the tachometer circuit while offering no limitation on response time, which is determined only by the time constant of the lowpass filter comprised of resistor R8 and capacitor C4. The operational amplifier 28 which may be referred to as an error amplifier, also is adapted to provide a substantial amount of gain.

The output of the operational or error amplifier 28 couples by way of resistor R16 to one input of an inverter operational amplifier 30. The other input to the amplifier 30 is from control line 31 which couples from control logic to be described hereinafter in connection with FIG. 4. The output of the amplifier 30 couples to motor drive stage. This motor drive stage comprises resistors R17 and R18. Resistor R17 couples from the output of amplifier 30 and also connects to resistor R19. Resistor R19 couples across from the input to output of the operational amplifier 30. The junction between resistors R17 and R18 couples to operational amplifier 32. The operational amplifier 32 also has a roll off capacitor C7 associated therewith along with an associated resistor R20. There are also provided two additional resistors R21 and R22 which couple directly to a Darlington transistor Q1. This circuit is connected in such a way as to produce motor drive current proportional to the input to the stage. It is noted in FIG. 2 that as part of this output drive stage there is a low value resistor R23 which is a current sensing resistor sensing the current through the transistor Q1. The resistor R22 in this respect forms part of a feedback loop back to the inversion input of the operational amplifier 32. The transistor Q1 has its collector coupled directly to the motor M1.

By design, the motor current, and hence the gear box output torque, is limited to some maximum value. This value has been chosen to protect the gear box against over-torque and yet trip the circuit breaker in the event of any pump binding.

Figure 4A:
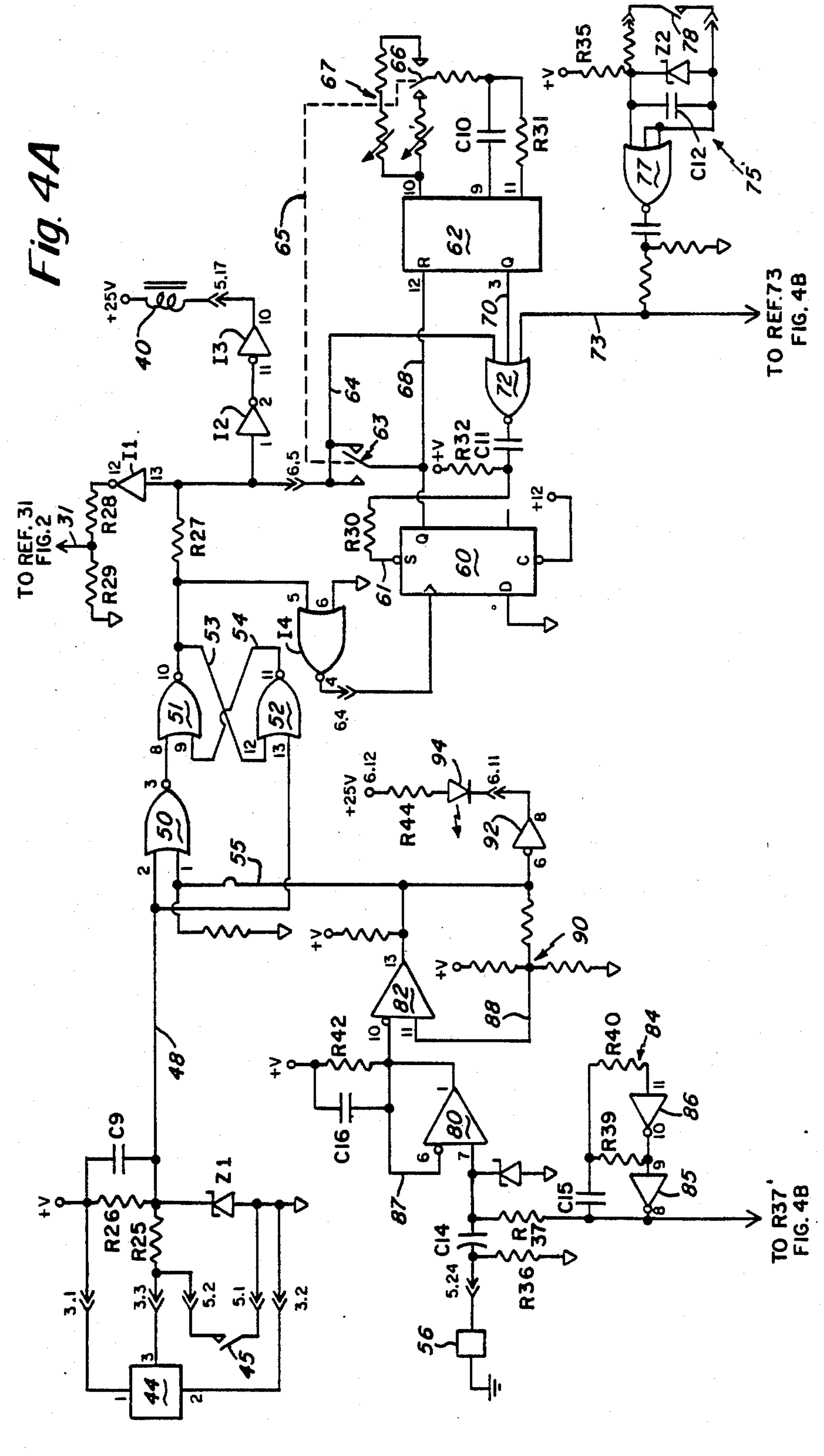
FIGS. 4A and 4B together comprise additional control circuitry in accordance with the present invention for carrying out complete dispensing operation.
Figure 4B:
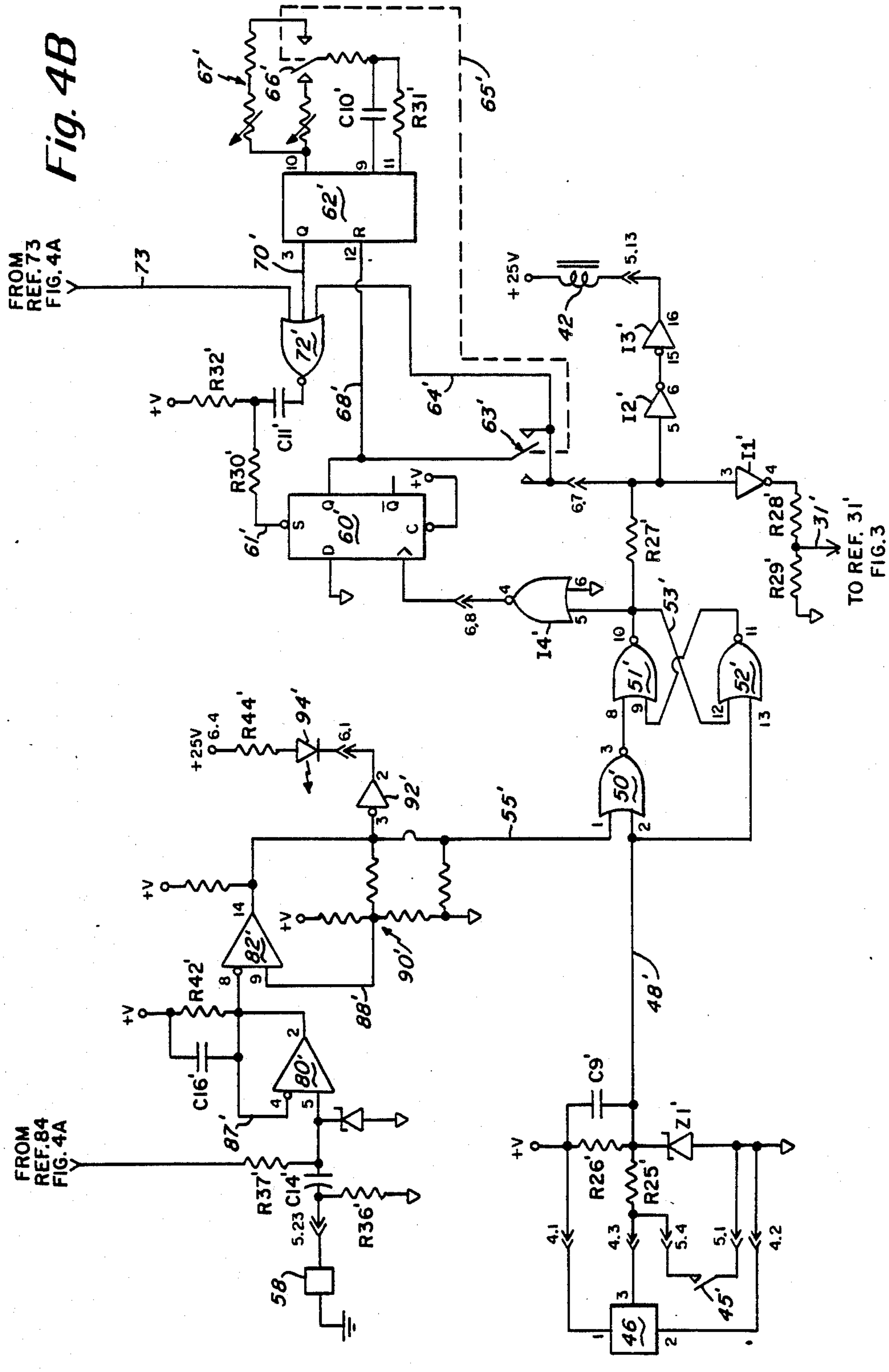

Reference may now be made to FIGS. 4A and 4B which illustrate the further control circuitry for controlling the dispensing operation. In FIGS. 4A and 4B, much of this circuitry is similar with one portion of the circuit being associated with left tank operation and the other portion being associated with right tank operation. In this regard, it is noted that there is a left dispense solenoid 40 and a right dispense solenoid 42. There is also a left dispense switch 44 and an associated right dispense switch 46. Both of the solenoids 40 and 42 are conventional solenoid control valves. A pressure regulator is used in the water circuit to keep the flow rate constant over a wide range of water pressure. The dispense switches 44 and 46 are each Hall effect switches. Such switches operate on the principle of proximity of magnetic fields.

Because of the similarity of the control circuitry relative to the left and right tanks, reference will now be made primarily only to the left tank control circuitry with the associated left dispense solenoid 40 and left dispense switch 44. There is a network associated with the left dispense switch 44 which includes a Zener diode Z1 along with resistors R25 and R26 and capacitor C9. The resistor R25 is for current limiting. The Zener diode Z1 and capacitor C9 provide protection for the CMOS gate 50. The resistor R26 and capacitor C9 provide noise filtering.

It is also noted that there is a further associated switch 45 in parallel with pins 2 and 3 of the switch 44. This switch 45 is a beverage hose switch which can also be used in an alternate embodiment for controlling the dispensing. In the main embodiment described herein, the switching occurs directly at the machine. However, in an alternate embodiment of the invention, the product may be dispensed through a beverage hose having switches at the end thereof with one of these switches being switch 45 illustrated herein.

In operation, the output line 48 taken from the switch network is normally at its high logic level state. However, when the switch 44 is activated, then the line 48 goes to its low logic level state so as to initiate a dispense sequence. The line 48 couples to a logic circuit which includes a series of three NOR gates 50, 51, and 52. It is noted that the output of the gate 50 couples to one input of the gate 51. It is further noted that the gates 51 and 52 are cross-coupled as carried out by lines 53 and 54 so as to form a bistable circuit arrangement. It is further noted that the line 48 couples to both gates 50 and 52. It is also noted that there is another input at line 55 from a network that senses an out-of-juice condition.

In this regard, note the sensor probes 56 and 58 each associated, respectively, with one of the tanks for the storage of the beverage. In connection with the description herein, the sensor 56 can detect an out-of-juice condition and a signal is generated on line 55 as will be described in further detail herein. For the time being it can be assumed that the signal on line 55 is at a low logic level thus essentially enabling gate 50 and permitting direct control of the logic including gates 50–52 from line 48.

Assuming for the moment that switch 63 is set to its center/off position, the output from gate 51 couples by way of resistor R27 to line 64 and hence to inverter I1 and also along a second path to inverter I2 which drives Darlington transistor inverter I3. The output of transistor inverter I3 couples directly to the left dispense solenoid 40. The other side of the solenoid is coupled to a positive DC voltage. By way of the other path, the output of the inverter I1 couples to a voltage divider network comprised of resistors R28 and R29. One side of resistor R29 couples to ground and the junction between resistors R28 and R29 couples to line 31 (also see FIG. 2) which is the speed control line for setting a basic speed control signal coupled to operational amplifier 30 for modification by the signal at the other input thereto coupled from operational amplifier 28.

It is furthermore noted that the output of the logic gate 51 also couples to a further gate identified as inverter I4 because of its function. The output of inverter I4 couples to the clock input of flip-flop 60. Flip-flop 60 is a D-type flip-flop also having a "set" input at line 61 coupled by way of resistor R30. The assertion output or "Q" output of the flip-flop 60 couples to a timer device 62 and also couples by way of a switch contact 63 to line 64. It is noted that the switch contact 63 is ganged by way of dotted line 65 with a similar switch contact 66 associated with the timing device 62. The ganged switch contacts 63, 66 are adapted to assume three different positions depending upon whether manual dispensing is desired or automatic dispensing of a glass of beverage, say, or a pitcher of beverage. In particular the switch contact 66 is adapted to change a resistor network 67 associated with the timing device 62 so that the timing device 62 has different time-out periods depending upon the position of the switch contact 66. With regard to the switch contact 63, this makes the same switch interconnection in either automatic position but is open for manual operation.

The control for the timing device 62 is basically from the input line 68 which couples directly from the flip-flop 60. The timing device 62, which is comprised of a CMOS R-C oscillator driving a CMOS binary counter, in addition to having the timing resistor network 67, also has an isolation resistor R31 and timing capacitor C10 for providing the necessary R-C timing periods. The output from the timing device 62 is taken at line 70 and this output couples to a NOR gate 72. The line 64 previously identified, also couples to another input of the gate 72. Finally, there is a third input by way of line 73 to the NOR gate 72 taken from the circuit 75 to be described in further detail hereinafter. The output of gate 72 couples by way of an R-C pulse forming network including resistor R32, in capacitor C11 and further by way of resistor R30 to line 61 which is the set input to the flip-flop 60.

As indicated previously, when there is no call for a dispense, the signal on line 48 is normally at a high logic level. Under this condition, the output of gate 50 is at a low logic level and the output of gate 51 is at a high logic level. Still assuming that switch 63 is open, the high logic level is coupled through resistor R27 to line 64. The inverter I1 inverts this signal to a low logic level signal at the output thereof. This means that the voltage across the voltage divider network of resistors R28 and R29 is essentially zero volts and thus there is no speed control signal coupled by way of line 31. Furthermore, the high voltage level signal at the output of gate 51 is inverted by inverter I2 and thereby causes the Darlington transistor I3 to turn off the energizing solenoid coil 40. Also, the high logic level signal at the output of gate 51 is inverted by inverter I4 to a low voltage level signal coupled to the clock input of D-type flip-flop 60. This does not clock the flip-flop because the D-type flip-flop 60 is looking for a low level to high level voltage transition. Thus, the flip-flop 60 does not change state and no timing sequence is commenced. Thus, in a pre-dispense state, there is no speed control signal for controlling the pump motor and thus the pump motor is off, the solenoid 40 is also off shutting off the water flow and there is no timing sequence that commences.

When a dispense is called for as indicated previously, the signal on the line 48 then reverts to a low voltage level. Assuming that the signal on line 55 is also at a low voltage level because there is sufficient syrup to pump, then the output of gate 50 goes to its high voltage level signal and the output of gate 51 goes to its low voltage level signal. This low voltage level signal is coupled through resistor R27 and inverter I1 to cause a high voltage level at the output of inverter I1. This high voltage level signal essentially biases the voltage divider network of resistors R28 and R29 and sets the speed control which is coupled by way of line 31 into the operational amplifier 30. The low level signal at the output of gate 51 is also inverted by inverter I4 and couples to the D-type flip-flop 60 clocking this flip-flop. It is noted that the flip-flop 60 has at its D input a ground potential signal and thus when the flip-flop is clocked, it is essentially reset so that the Q output thereof goes to a low voltage level signal. This low voltage level signal is coupled by way of line 68 to enable the timer 62 to commence the timing sequence.

It is noted that the output of flip-flop 60 also couples to the switch contact 63, which in either automatic position of the three-position switch, connects the output of the flip-flop 60 to line 64. The resistance of resistor R27 is chosen to be high enough so that when switch 63 is in either automatic (closed) position, the logic level on line 64 is determined by the output of flip-flop 60, irrespective of the level of the output of gate 51. As previously mentioned, the logic level of line 64 controls both the water control solenoid and the concentrate pump motor speed. Hence, in either automatic position, control of the dispense function is determined by the logic state of flip-flop 60.

Thus, in summary, at an initial dispense sequence, when the signal on line 48 goes to its low voltage level signal, a number of things occur. The pump motor commences pumping under control of a signal on line 31. The left dispense solenoid 40 is energized. The timing is commenced by virtue of latching of the timing device 62 at its reset input by the signal on line 68 from the flip-flop 60.

Thus, the timer 62 is initiated when the flip-flop 60 is activated. As indicated previously, the switch contact 66 is ganged with the contact 63 and the contact 66 has two different positions which present two different timing networks. One timing period is of shorter duration representative of the time necessary for dispensing a cup of beverage. The second timing period is of longer duration such as, for example, the length of time necessary for dispensing a pitcher of beverage. Depending upon the setting of the switch contact 66 there is a timing out that takes place and at the end of this timeout period the Q output of the timer goes high. In this regard, note line 70 at the Q output from the timer 62. When this signal goes high, the output of the gate 72 goes low. The network formed by capacitor C11 and resistor R32 and resistor R30 forms a low-going pulse at the set input at line 61 of the flip-flop 60. This sets the flip-flop 60 so that the Q output thereof goes high. The timer 62 is disabled and the high output from flip-flop 60 by way of contact 63 couples to the input of the gate 72 and also terminates speed control and de-energizes the solenoid 40. Note the high output from flip-flop 60 is coupled by way of the inverter I2 and Darlington transistor I3 which de-energizes the solenoid. This high voltage signal is also inverted by inverter I1 to provide a zero voltage across the network of resistors R28 and R29 so as to interrupt speed control.

As mentioned previously, there is also a circuit 75 that couples by way of line 73 into the gate 72. This circuit includes a NOR gate 77 and associated network including capacitor C12, Zener diode Z2 and resistor R35. This network also includes a membrane switch 78. This switch may also be associated with a beverage hose and may be disposed in a location similar to the location of the switch 45. The switch 78 when actuated, provides a high voltage level pulse on line 73 which is instrumental in setting the flip-flop 60 to terminate a timed dispense sequence.

In that the description herein is now directed primarily to the left dispensing unit, reference has been made hereinbefore to the juice probe 56. The purpose of this probe is to determine when the concentrate juice has been almost depleted. When this occurs, it is desired to interrupt the dispensing, yet permit the completion of a dispense sequence already initiated.

The output from the probe 56 couples to a network comprised of resistors R36 and R37 along with capacitor C14. The opposite side of capacitor C14 couples to an open collector comparator 80. The output of comparator 80 couples to the inversion input of a further comparator 82. It is the output of comparator 82 that couples to the aforementioned line 55.

Figure 7H:
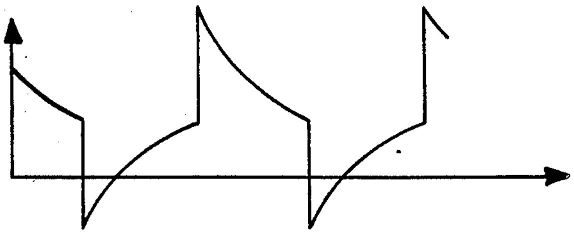
Figure 7I:
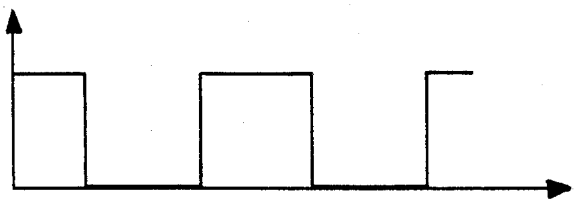
Figure 7J:
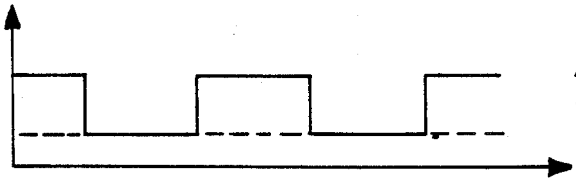
Figure 7K:
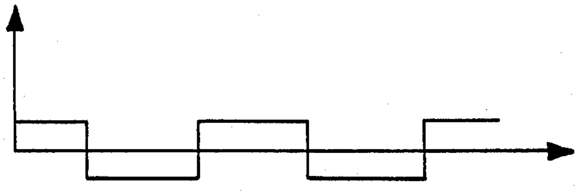

There is a common oscillator circuit 84 which is used in association with both probes 56 and 58. This oscillator circuit comprises inverters 85 and 86 along with resistors R39 and R40 and capacitor C15 (See FIG. 7H). The output of the oscillator 84 (See FIG. 7I) couples by way of resistor R37 and capacitor C14 to the probe 56. (See FIGS. 7J and 7K)

Figure 7L:
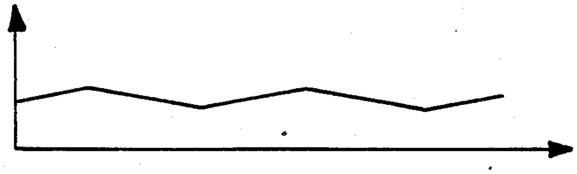

Part of the detection circuitry associated with the probe 56 is an envelope detector which basically comprises comparator 80, resistor R42 and capacitor C16. (See FIG. 7L) This circuit is connected in a feedback arrangement with the line 87 coupling back to the inversion input of the comparator 80. There is also another feedback arrangement including line 88 associated with the comparator 82. In this connection it is noted that the output of the comparator 82, in addition to coupling to line 55, also couples by way of a resistor network 90 to line 88 and back to one of the inputs of the comparator 82. The output of the comparator 82 also couples to a Darlington transistor 92 and from there to a light emitting diode indicator 94. The other side of the indicator 94 couples by way of resistor R44 to a +25 volt DC supply. The LED indicator 94 is illuminated to indicate an out-of-concentrate condition.

The circuitry including the comparators 80 and 82 continuously measures the conductivity between two electrodes which are disposed in the wall of the concentrate reservoir. One of these is connected to ground, the other is connected to the circuitry being described. In the circuit diagram, these are depicted by the probe 56. Also note in FIG. 1A, the probes to 56 and 58 along with the common connection 57.

When the level of the concentrate drops below the electrode level, the resistance to ground rises beyond a threshold point and the LED indicator 94 is turned on. Previous to this condition, when there is sufficient concentrate in the concentrate reservoir, the probe 56 presents a low impedance which essentially dampens the oscillator 84 output and creates a relatively high voltage signal at the output of comparator 80. In this regard, the oscillator 84 may have a frequency of approximately 1 KHz. It is also noted that the time constant of the envelope detector comprised of resistor R42 and capacitor C16 is much greater than the 1 KHz frequency. Thus, the voltage fed to the comparator 82 from the comparator 80 is of a magnitude to maintain the output of the comparator 82 at a low voltage level setting. This low voltage level setting on line 55 essentially has no effect on the logic circuitry including gate 50 and thus dispensing is permitted by way of the left dispense switch. This low level output is also coupled to Darlington transistor 92, turning it off and maintaining the LED 94 non-illuminated. Thus, as long as there is sufficient concentrate in the reservoir, dispensing is permitted and the LED 94 is extinguished.

When the probe 56 senses the high resistance conditions, input to the oscillating signal increases and the envelope detector comprised of comparator 80, resistor R42 and capacitor C16 responds to this change. The envelope detector output at line 87 actually follows the negative envelope of the waveform and when the voltage is sufficiently low, comparator 82 switches to provide a high voltage level output at its output. This high voltage level signal is coupled to Darlington transistor 92 to cause illumination of the LED 94. This high voltage level signal also is coupled by way of line 55 to gate 50 to essentially disable gate 50. This prevents any future negative going inputs at line 48 from effecting the gate 50. However, if there has previously been a low voltage signal on line 48 setting the circuit, then even if a high voltage signal occurs on line 55, this will not effect the circuit. Once the flip-flop formed by gates 51 and 52 is latched, the dispensing cycle continues as usual.

A description has just now been completed with regard to the left dispensing unit and the operation thereof. The right dispensing unit is substantially identical and thus is not described in further detail herein. The right dispensing unit is identified with the use of prime numbers, but otherwise uses the same reference characters.

Now, reference is made to FIG. 5 which shows the ice bank circuit in accordance with the present invention. This circuit is similar to the circuit described in FIGS. 4A and 4B in connection with the concentrate sensing probes 56 and 58. Thus, in FIG. 5 the circuit includes an oscillator 100 which comprises inverters 101, 102, and 103 along with resistors R50 and R51 and capacitor C20. These resistors, capacitors and inverters are connected in an oscillator circuit so as to provide an output therefrom which couples to a buffer inverter 105. The output of a buffer inverter 105 is a squarewave signal which may be at a frequency of approximately 1.0 KHz. The output of the buffer 105 couples by way of resistor R52 and capacitor C21 to the ice bank probe 107. It is noted that the probe 107 is schematically illustrated as a variable resistance This probe is also depicted in the perspective view of FIG. 1. Also coupled to the ice bank probe 107 is a further resistor R53. Also, there is provided a zener diode Z3 connected between the capacitor C21 and the resistor R52. The diode Z3 is coupled to ground. The capacitor C2 is a DC blocking capacitor of relatively large value having substantialy zero AC impedance. The probe detection circuitry includes an envelope detector 112 which is comprised an open collector comparator 110, resistor R54 and capacitor C22. The output of the envelope detector 112 couples to the inversion input of a second comparator 115. The comparator 115 has associated therewith, a voltage divider network of resistors R55 and R56 and also has a feedback path including resistor R57. There is also provided a pull-up resistor R58 coupled at the output of the comparator 115. The output of the comparator 115 couples to a pair of additional comparators 116A and 116B. The inversion inputs to the comparators 116A and 116B couples from a voltage divider network which includes resistors R60 and R61. The outputs of the comparators 116A and 116B are tied in common and coupled to a light emitting diode 120. In series with the diode 120 is an additional resistor R65. The diode 120 is optically coupled to photo-triac 124. This triac couples by way of a network including capacitor C24 and resistors R66 and R67 to a triac 126. The triac 126 controls the compressor 130 illustrated in FIG. 5.

With regard to the operation of FIG. 5 it is noted that the waveforms of FIGS. 7A–7L also apply to the operation of the circuit of FIG. 5.

In operation, when there is not sufficient ice build-up on the evaporation coils, the ice probe 107 is detecting the presence of water and thus is at its low impedance state. This means that the output oscillations from oscillator 100 coupled to envelope detector 112 are at a lower amplitude. These oscillations are detected by the envelope detector 112 which essentially tracks the negative portion of the squarewave. When ice is not being detected, this voltage level signal is not sufficiently negative so that the output of the comparator 115 is at a low voltage level setting. This low voltage level signal is coupled by way of comparators 116A and 116B, which are utilized here merely as switches, to provide low voltage level at the output thereof which illuminates the light emitting diode 120. This illumination causes conduction of the photo-triac 124 which in turn drives the control triac 126 for operating the compressor 130. Thus, as long as no ice build-up is indicated, the compressor 130 is maintained in operation.

Alternatively, when a high resistance is detected at the probe 107 indicative of ice build-up, then the output of the oscillator 100 coupled to the envelope detector 112 causes a decrease in the output from the encelope detector. This decrease in voltage is sensed by the comparator 115 so that the output thereof goes to its high voltage state. This high voltage signal is coupled by way of comparators 116A and 116B as a high voltage level signal at the output thereof which turns off the lighting emitting diode 120. This interrupts conduction in the photo-triac 124 and thus the control triac 126 then falls out. This de-energizes the compressor and thus prevents further ice build-up. As the ice melts, the resistance at the probe 107 will again decrease and the circuit will again start the compressor by way of conduction of the control triac 126. This operation continues in a cyclic manner at a very low frequency so as to maintain the ice build-up at the proper level.

It is also noted that the comparator 115 is constructed with the feedback resistor R57 and with resistors R55 and R56 so as to provide a predetermined amount of circuit hysteresis. This hysteresis provides an effective dead zone. In the case of the ice bank circuit, this is desirable so that there is not a sensitive switching point but instead, the compressor is held off for a sufficient period of time so that there is sufficient melting to maintain proper ice bank operation. Also, a similar form of hysteresis occurs with regard to similar circuit arrangements found in FIGS. 4A and 4B.

Having now described a limited number of embodiments of the present invention, a number of modifications thereof are contemplated as falling within the scope of the present invention as defined by the appended claims. For example, herein in the preferred embodiment has been described a timer which enables dispensing of preselected volumes of product. In an alternate embodiment however, the timer may be removed in which case the dispenser is adapted primarily only for manual operation. The timer may be unplugged without effecting manual operation at all. In this connection, note in FIG. 4A the connector points 6.4 and 6.5 by disconnection at this points. The manual operation is still in effect and the output of the flip-flop comprised of gates 51 and 52 essentially controls the signals to the solenoid and pump.

What is claimed is:

1. A system for dispensing and controlling the concentration of a product comprised of a liquid concentrate and water, said concentrate being dispensed by pump operation and said water being dispensed by valve control, said system comprising; means for controlling the valve, means for controlling the pump, means for initiating a dispense cycle so as to initiate operation of the valve and pump substantially concurrently, said means for controlling the pump including a speed control means having multiple selectable positions for providing multiple pump speeds so as to provide variable concentration of the final dispensed product, wherein said speed control means comprises a speed control circuit having manual control switch means settable at multiple different switch position settings to provide different speeds, said manual control switch means comprising coded selection switch means enabling correlation between selectable settings and pump speed, said speed control circuit having an input network adapted to sense the speed of rotation of the pump motor shaft, and to provide a pump motor rotation signal representative of pump motor shaft speed, and means for combining said pump motor rotation signal with a desired speed setting signal from said switch means to provide a control signal for operating said pump motor at the desired speed.

2. A system as set forth in claim 1 wherein said input network comprises a frequency-to-voltage converter for providing a DC signal, the amplitude of which is a function of the operating speed, and further comprising a photo transistor and associated light source, wherein said frequency-to-voltage converter circuit comprises a pulse network.

3. A system as set forth in claim 1 wherein said means for combining includes an error amplifier having two inputs and an output that controls the motor speed.

4. A system as set forth in claim 3 wherein one input to the error amplifier couples from said manual control switch means and the other input to the error amplifier receives the voltage signal representative of motor shaft speed.

5. A system as set forth in claim 3 wherein said manual control switch means comprises binary coded decimal switch means enabling correlation between selectable decimal settings and pump speed.

6. A system as set forth in claim 5 wherein said binary coded decimal switch means comprises a plurality of resistors, a like plurality of switch contacts, means coupling individual resistors and switch contacts in series circuit, and means coupling the resistor and switch contact series circuits in parallel.

7. A system as set forth in claim 6 wherein said binary coded decimal switch means comprises a two digit binary coded decimal switch for providing speed settings of 00–99.

8. A system as set forth in claim 1 wherein said coded selection switch means comprises a digital selection switch.

9. A system as set forth in claim 8 wherein said selection switch is a decimal selection switch.

10. A system as set forth in claim 9 wherein said decimal selection switch has two digits.

11. A system as set forth in claim 10 wherein said decimal selection switch is a binary-coded decimal switch.

* * * * *